Sept. 20, 1927.  
J. DAVIS  
1,642,722  
GLASSWARE SHAPING MACHINE  
Filed Sept. 25, 1925 2 Sheets-Sheet 2

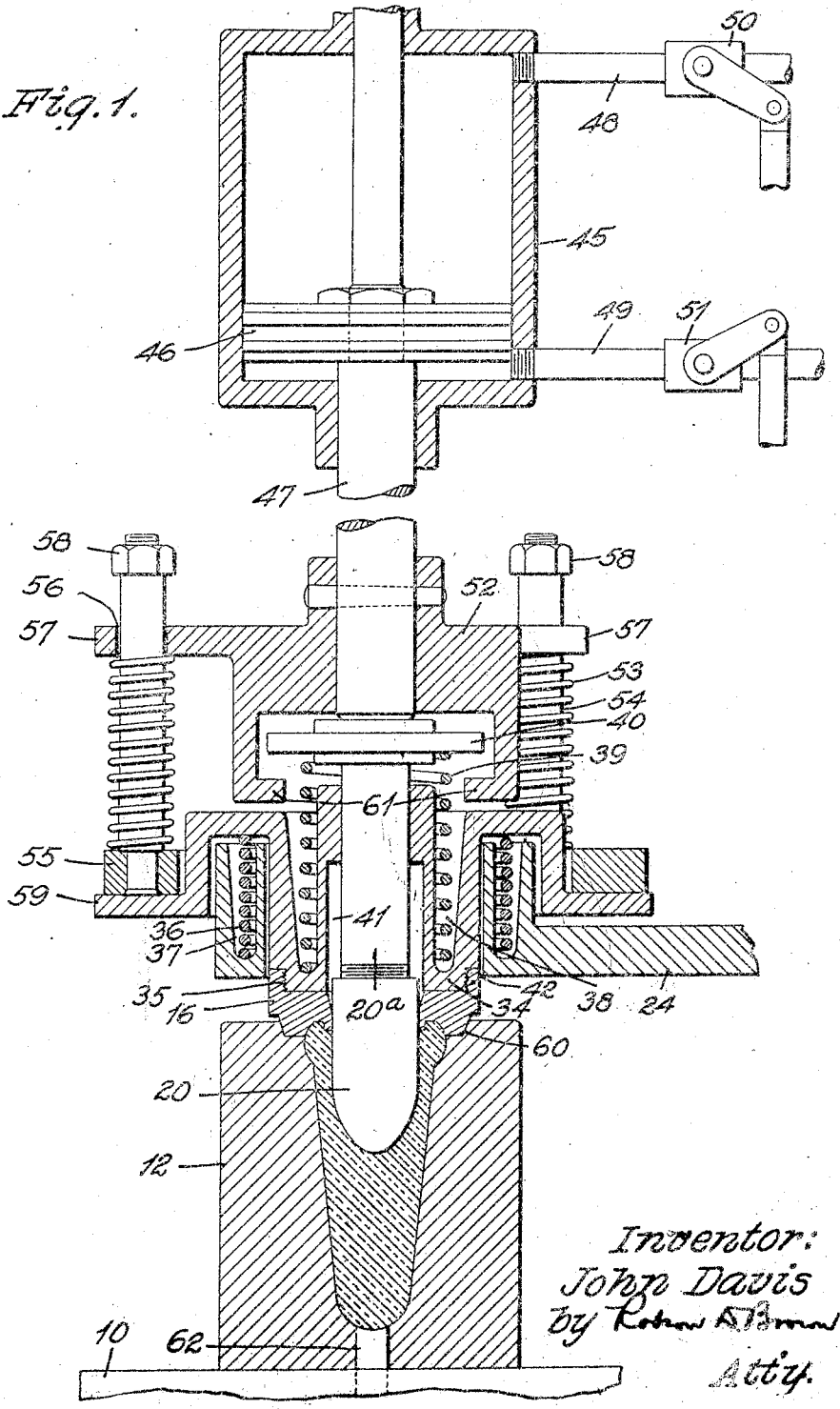

Inventor:
John Davis

Patented Sept. 20, 1927.

1,642,722

UNITED STATES PATENT OFFICE.

JOHN DAVIS, OF EAST HARTFORD, CONNECTICUT, ASSIGNOR TO HARTFORD-EMPIRE COMPANY, OF HARTFORD, CONNECTICUT, A CORPORATION OF DELAWARE.

GLASSWARE-SHAPING MACHINE.

Application filed September 25, 1925. Serial No. 58,517.

This invention relates to glass shaping apparatus and has particular relation to multiple mold machines adapted to produce pressed ware, or to produce pressed parisons that are expanded to final form by blowing.

The object of the invention is to provide a machine of the class described that shall be capable of producing ware of different sizes and shapes, thereby enabling the manufacturer to fill several small orders by the use of a single machine, and obviating the necessity of employing separate machines for each type of ware.

This object is accomplished by providing molds with the desired mold cavities or mouth finishes mounted upon a mold table forming a part of the shaping machine, and by providing each individual mold with its own neck ring and plunger which are combined in a movable structure adapted to be brought into operative relation with its co-operating mold at the pressing station and to be moved aside from the mold at the other operating stations.

After a mold charge has been delivered to its particular mold and the neck ring and plunger structure associated with that mold has been brought into engaging alignment therewith at a pressing station, the charge is pressed in the mold by means of a single fluid-pressure operated mechanism which also actuates the neck rings and plungers associated with all of the other molds, as the molds arrive successively at the pressing station.

The resultant shaped articles may be in the form of completed pressed ware, and may therefore be removed for annealing, or they may have the form of parisons or blanks, in which case the parisons or blanks may be transferred to blow molds and blown therein to finished form.

In the drawings:

Figure 1 is a central vertical section taken on line 1—1 of Fig. 3, showing the mold, neck ring and plunger used to form a pressed parison according to the invention;

Figure 3:
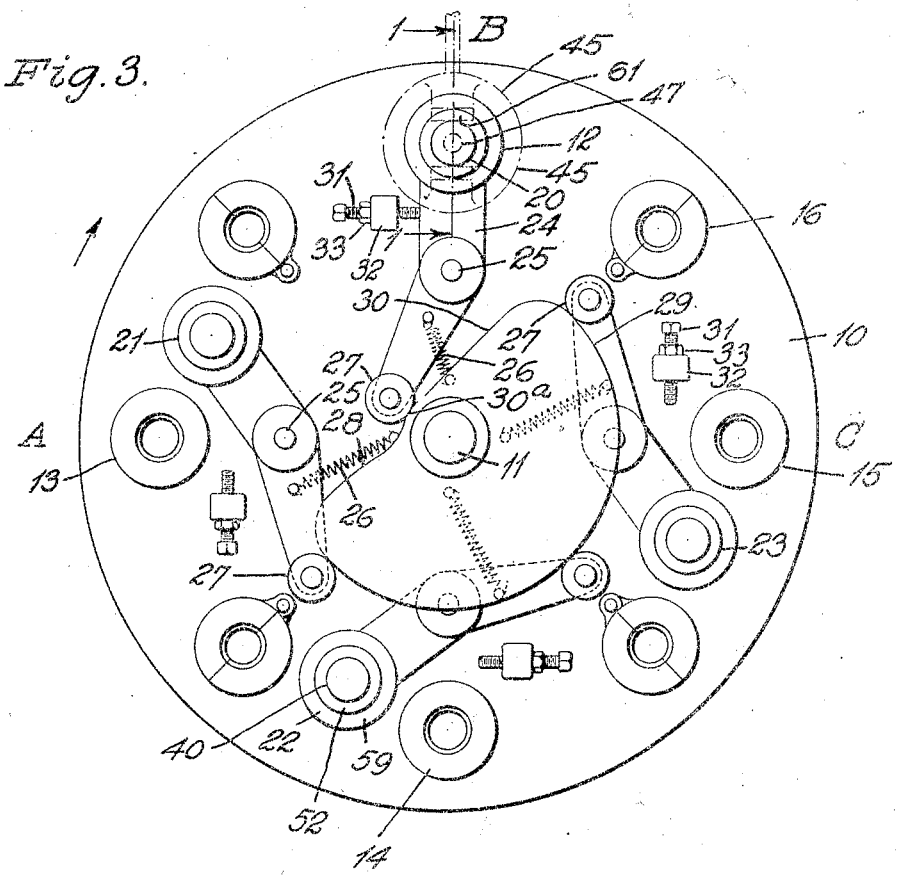
Fig. 3 is a plan view of a shaping machine provided with pressing mechanisms constructed in accordance with the invention.
Figure 2:
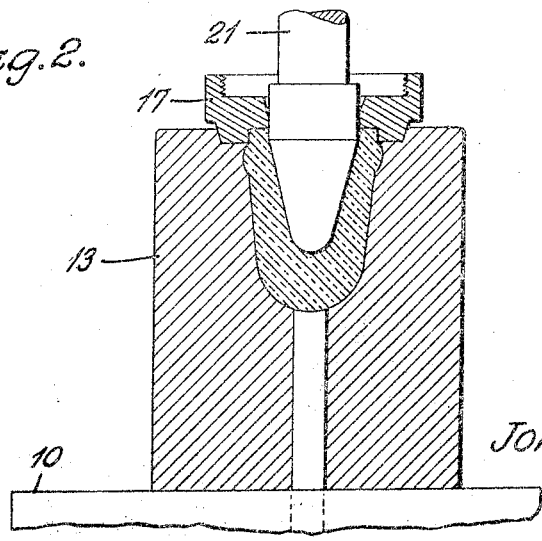
Fig. 2 is a central vertical section of a mold, neck ring and plunger, used to form a different type of ware from that of Fig. 1.

Referring to the drawings, the numeral 10 indicates a mold table mounted upon a shaft 11 for step-by-step rotation in a clockwise direction. Parison molds 12, 13, 14 and 15, with individual neck ring and plunger structures 20, 21, 22 and 23, are mounted on the table 10 and are carried thereon successively to several stations, at which the following operations are performed. A is the charging station at which the parison mold receives its mold charge. B is the pressing station at which the mold charge either is pressed into a parison or blank as herein shown or is pressed to finished form, and C is the station at which, in the structure herein shown, the parison is transferred to a blow mold 16. Each blow mold is mounted upon the table 10 adjacent to its particular parison mold, which is designed to produce blanks for the type of ware to be blown in that blow mold.

In each individual pressing structure, the neck ring and the plunger are carried by an arm 24 which is pivoted on a stud 25 secured in the mold table 10 and is swung into alignment with its parison mold by a tension spring 26, one end of which is attached to the arm 24 and the other to the table. The springs 26 cause cam rolls 27 mounted on the arms 24 to follow the periphery of a stationary cam 29. A contour 28 of this cam rocks the arms 24 to position the neck rings and plungers over their parison molds at the pressing station, and another contour 30 of this cam moves the neck rings and plungers out of alignment therewith. Between the contours 28 and 30 the cam 29 has a dwell portion 30ª which maintains the neck ring and plunger structures away from their molds until the molds again approach the pressing station.

The accurate alignment of the neck rings and plungers with the molds at the pressing station B is accomplished by providing adjustable stop screws 31 which are threaded into ears 32 on the mold table 10, the screws being provided with nuts 33 to lock them in their adjusted positions. These screws are set so that, as each plunger and neck ring structure arrives in correct alignment with its mold, the arm on which they are carried engages the stop 31 and is thereby prevented from being moved further by the spring 26.

Referring to Fig. 1, which shows the details of construction of the neck ring and plunger mechanisms, the neck ring 16 is removably secured to a body member 34 by screw threads 35 and is normally retained in a raised position above the level of its mold by a spring 36 which is placed in an annular recess 37 formed in the arm 24, and which bears beneath the body 34 to which the neck ring 16 is attached. The body member 34 extends through an opening 42 near the end of the arm 24 and concentric with the recess 37.

Another annular recess 38 formed in the body 34 contains a spring 39 which bears against the under side of a head 40 formed on the plunger 20 and normally retains the plunger in an elevated position clear of the mold 12 and partially within a bore 41 provided in the body 34.

The neck ring 16 and the plunger 20 are mounted within the opening 42 in the arm 24 so as to be readily removed and replaced without the necessity of stopping the operation of the apparatus, and the plunger itself may be readily removed from the stem 20ª on which it is mounted.

The pressing mechanism located at the station B comprises a cylinder 45 provided with a reciprocating piston 46, a piston rod 47, ports 48 and 49 for admitting and exhausting fluid pressure, and valves 50 and 51 which respectively control the ports 48 and 49. On the lower end of the piston rod 47 is secured a head 52 that supports neck ring cushion springs 53 which are provided to retain the neck ring 16 on the mold 12 during the pressing operation. These springs 53 surround studs 54 which are secured to an annular member 55 and pass through holes 56 provided in ears 57 formed on the head 52. Nuts 58 are provided at the upper portions of the studs for limiting the downward position of the annular member 55 when the piston 46 is raised.

When the valve 50 is opened, either automatically or manually, to admit fluid pressure to the cylinder 45 above the piston 46, the head 52 descends, whereupon the annular member 55 engages a flange 59 formed on the body 34 and depresses the neck ring 16 into a cavity 60, formed in the mold 12, prior to the contact of the plunger with the mold charge, then unformed within the mold, and as the head descends further to depress the plunger, the pressure of the springs 53 acts on said neck ring with increasing pressure. The plunger is lowered by the contact of the piston rod 47 with the plunger head 40.

When the operation of the cylinder 45 is reversed by automatic or manual manipulation of the valves 50 and 51, to admit pressure beneath the piston 46, the head 52 is raised. This head is provided with inwardly projecting flanges 61 that are adapted to engage the under side of the head 40 of the plunger and lift it out of the mold, thus providing for positive withdrawal of the plunger in addition to the action of the spring 39. The upward movement of the head 52 and its associated parts relieves the compression of the spring 36, thereby enabling this spring to lift the neck ring 16. The cavity in the pressing head 52 above the flanges 61 is open at its ends, and the head is so placed that the heads 40 of the pressing plungers may freely enter and leave the cavity in the pressing head as the table rotates.

After the neck ring and plunger have been raised clear of the mold, the table is advanced a step to bring the mold containing the pressed parison to the transfer station C, where the parison is raised by means of a valve 62 and is then removed and transferred, either manually or automatically, to its associated blow mold, in which it is blown to finished form.

This rotation of the table 10, which brings the finished parison to the transfer station C, also brings the next parison mold 13 and its cooperating neck ring and plunger to a position at the pressing station B, where the charge in the mold 13 is pressed in the manner described above, for forming a parison or other pressed article which may be different in shape from the article pressed in the preceding mold. Similarly, the other press molds 14 and 15 are brought in succession to the pressing station and articles are pressed therein of shapes corresponding to the shapes of their individual neck rings and plungers, which shapes may be similar to or different from the shapes of the preceding articles. Thus, by feeding successive molds with different mold charges, to accommodate the different molding requirements of each mold, and by providing neck rings and plungers designed to cooperate with their particular molds, ware of different kinds, shapes and weights may be formed on a single machine.

The molds, and also their cooperating neck rings and plungers may be readily removed and replaced by others of different sizes and configuration.

Suitable slides or other mechanical connections may be employed, instead of the stationary cam herein shown, for moving the neck ring and plunger mechanisms into and out of cooperative relation to the press molds. This invention is not limited to the other details of construction herein shown, which may be modified within the scope of the appended claims.

I claim as my invention:

1. A glass shaping machine comprising a plurality of molds, a permanently vertical pressing plunger associated with each of said molds, and a single pressing mechanism adapted to actuate said plungers successively.

2. A glass shaping machine comprising a plurality of molds, a permanently vertical pressing plunger associated with each of said molds, means for moving said molds successively to a pressing station, and a single pressing mechanism adapted to actuate said plungers as said molds successively arrive at said pressing station.

3. A glass shaping machine comprising a plurality of molds, a permanently vertical pressing plunger associated with each of said molds, means for moving said molds successively to a charging station, a pressing station and a delivery station, and means for bringing each plunger into cooperative relation to its mold at said pressing station and for maintaining each plunger away from cooperative relation to its mold at said charging and delivery stations.

4. A glass shaping machine comprising a plurality of molds of different shapes, a permanently vertical plunger associated with each of said molds and having a shape conforming thereto, means for moving said molds successively to a pressing station, and a single pressing mechanism adapted to actuate each of said plungers as they successively arrive at said pressing station.

5. A glass shaping machine comprising a plurality of molds of different shapes, a neck ring and a permanently vertical plunger associated with each of said molds, means for moving said molds successively to a pressing station, means for moving said neck rings and plungers into and out of alignment with their associated molds, and a single pressing mechanism adapted to actuate said neck rings and plungers as they successively arrive in alignment therewith and with their associated molds.

6. A glass shaping machine comprising a plurality of molds of different shapes, a neck ring and a permanently vertical plunger associated with each of said molds, means for moving said neck rings and plungers into and out of alignment with their associated molds, means adapted to depress said neck rings and plungers as they successively arrive in alignment with the molds, and means for retracting said neck rings and plungers.

7. A glass shaping machine comprising a plurality of molds of different shapes, a plunger and a neck ring associated with each of said molds, an arm provided with an aperture into which said neck ring and said plunger are loosely retained, so as to be readily removed and replaced, means for moving said arm to place the said neck ring and plunger in alignment with its mold, and means for actuating said neck ring and plunger while in said alignment.

8. A glass shaping machine comprising a plurality of molds, a pressing mechanism, a plunger associated with each of said molds and adapted to be brought into alignment therewith, a head forming a part of said plunger and adapted to be positioned in engaging relation with said pressing mechanism, and means for raising and lowering said plunger while in said engagement.

9. A glass shaping machine comprising a plurality of molds of different shapes, a single pressing mechanism, an apertured arm associated with each mold, a plunger loosely mounted in the aperture of each of said arms and having a contour which corresponds with its particular mold, a head formed on each of said plungers and adapted to be positioned in engaging relation with the said pressing mechanism, and means adapted to raise and lower the said plungers while in said engagement.

10. A glass shaping machine comprising a plurality of molds, an individual plunger and neck ring mechanism associated with each of said molds, an arm provided with an aperture in which said neck ring and plunger are removably mounted, means for moving said arm to place the said neck ring and plunger in alignment with its mold, and means for actuating said neck ring and plunger while in said alignment.

11. A glass shaping machine comprising a plurality of molds each adapted to receive a mold charge, a permanently vertical plunger associated with each of said molds and adapted to cooperate with said mold to press said mold charge into a shape which conforms to the contours of said mold and plunger, and a single pressing mechanism adapted to actuate all of said plungers.

12. A glass shaping machine comprising a plurality of molds, each adapted to receive a mold charge, a permanently vertical plunger and a neck ring associated with each of said molds and adapted to cooperate with said mold to press said mold charge into a shape which conforms to the contours of said mold, plunger and neck ring, and a single pressing mechanism adapted to actuate all of said plungers and neck rings.

13. Plunger and neck ring mechanisms for pressing glass articles, comprising a body member having a central opening, an annular recess opening upwardly and another annular recess surrounding said first-named recess and opening downwardly, a neck ring secured removably to said body portion, a support having an aperture for receiving said body member, and having a portion projecting into the outer annular recess of said body member, the said portion of the support having an annular recess opening upwardly, a plunger extending slidably through said body member and having an enlarged head at its upper end, a compression spring disposed in the inner annular recess of said body member and engaging beneath said plunger head, and a compression spring disposed in the annular recess of said support and engaging beneath a portion of said body member.

14. A press head for actuating individual plunger and neck ring mechanisms of a glass shaping machine, comprising a head provided with a cavity near its lower end, said cavity being open at opposite sides and having inturned flanges on the closed sides, studs extending loosely through openings in said head, an annular member secured to the lower ends of said studs, compression springs surrounding said studs between said head and said annular member, and means for raising and lowering said head.

15. A glass shaping machine comprising a rotatable mold support, a plurality of molds carried by said support, a pressing plunger associated with each of said molds and carried by said support, means for moving each plunger into axial alignment with its mold, and a single pressing mechanism adapted to actuate said plungers successively.

16. A glass shaping machine comprising a rotatable mold support, a plurality of molds carried thereby, a pressing plunger associated with each of said molds and carried by said support, means for moving said plungers laterally into axial alignment with said molds, and a single pressing mechanism adapted to actuate said plungers successively.

17. A glass shaping machine comprising a rotatable mold support, plurality of molds carried by said support, a pressing plunger associated with each of said molds and pivotally mounted on said support, means for swinging said plungers into and out of axial alignment with said molds, and a single pressing mechanism adapted to actuate said plungers successively.

18. A glass shaping machine comprising a rotatable mold support, a plurality of molds carried by said support, a pressing plunger associated with each of said molds and pivotally mounted on said support, and means for swinging each of said plungers about a vertical axis into and out of axial alignment with its mold, and a single pressing mechanism adapted to actuate said plungers successively.

19. A glass shaping machine comprising a rotatable mold support, a plurality of molds carried by said support, a pressing plunger and cooperating neck ring associated with each of said molds and carried by said support, means for moving each plunger and neck ring into and out of axial alignment with their molds, and a single pressing mechanism adapted to actuate said plungers successively.

20. A glass shaping machine comprising a rotatable mold support, a plurality of molds carried thereby, a plurality of pressing plungers mounted to revolve about the axis of said support, means for moving said plungers into and out of axial alignment with said molds, and a single pressing mechanism adapted to actuate said plungers successively.

Signed at Hartford, Conn., this 24th day of Sept., 1925.

JOHN DAVIS.